United States Patent [19]

Stahler

[11] Patent Number: 4,651,195

[45] Date of Patent: Mar. 17, 1987

[54] MONOCHROME-COMPATIBLE COLOR SLOW SCAN TELEVISION SYSTEM

[75] Inventor: John P. Stahler, San Diego, Calif.

[73] Assignee: Robot Research, Inc., San Diego, Calif.

[21] Appl. No.: 481,752

[22] Filed: Apr. 4, 1983

[51] Int. Cl.⁴ .......................................... H04N 11/18
[52] U.S. Cl. ...................................... 358/14; 358/11; 358/12; 358/85
[58] Field of Search ................... 358/12, 141, 140, 85, 358/11, 75, 14

[56] References Cited

U.S. PATENT DOCUMENTS

| | | | |
|---|---|---|---|
| 3,617,620 | 11/1971 | Arimuray | 358/12 |
| 3,781,463 | 12/1973 | van den Bussche | 358/142 |
| 4,057,836 | 11/1977 | Munsey | 358/140 |
| 4,084,181 | 4/1978 | Mita et al. | 358/12 |
| 4,335,393 | 6/1982 | Pearson | 358/27 |

OTHER PUBLICATIONS

Funkschau No. 24, Nov. 1980 Munchen; "Schmalband-Fernsehen (SSTV)", pp. 73-74.
QST, D. C. Miller, "Low-Cost Conversion of the Robot 400 to Color", Jan. 1981, pp. 11-15.
QST, D. C. Miller, "A Compatable Slow-Scan-Color Television System", Jun. 1982, pp. 15-17.
A5 Amateur Television Magazine, R. Suding, "8 and 12 Second Single Frame Color SSTV", Nov. 1982, pp. 32-35.
CQ, D. Ingram, "The World of Video", Dec. 1982, pp. 110-112.
QST, G. R. Steber, "SSTV to Fast Scan Converter", Mar., 1975, pp. 33-40.
QST, G. R. Steber, "Slow-Scan to Fast-Scan TV Converter", May, 1975, pp. 28-36, 46.
"The Complete Handbook of Slow-Scan TV", D. Ingram, 1977, TAB Books, pp. 173-189.
QST, J. Royle, "SSTV in Color", Nov. 1980, pp. 11-14.

Primary Examiner—John W. Shepperd
Attorney, Agent, or Firm—Baker, Maxham, Callan & Jester

[57] ABSTRACT

A method and system for translating between three complementary color component slow scan video signals and a composite color slow scan video signal containing a luminance information signal within a visible line interval of each slow scan video signal line and a chrominance information signal within the non-visible portion of each slow scan video signal line. The chrominance information signal includes during the non-visible portions of alternate slow scan video signal lines, a first color difference signal derived by subtracting the luminance information signal from one of three complementary color slow scan video signals and a second color difference signal derived by subtracting the luminance information signal from another of three complementary color slow scan video signals. The three complementary color component slow scan video signals are translated into the composite color slow scan video signal for transmission. Upon reception, the composite signal is translated into the three complementary signals for provision to a three memory slow-to-fast scan converter.

18 Claims, 6 Drawing Figures

MONOCHROME-COMPATIBLE COLOR SLOW SCAN TELEVISION SYSTEM

BACKGROUND OF THE INVENTION

The present invention generally pertains to slow scan television systems and is particularly directed to systems for translating monochrome-compatible color slow scan video signals.

Slow scan television systems utilize slow raster scan techniques in order to enable video signal image information to be transmitted over narrow bandwidth audio communication channels, such as the telephone lines. Such systems are described in two articles by Steber entitled "SSTV to Fast Scan Converter" appearing in the March 1975 issue of QST at pages 33–40, and "Slow-Scan to Fast-Scan TV Converter" appearing in the May 1975 issue of QST at pages 28–36 and 46. A slow scan television scan converter is described in U.S. Pat. No. 4,057,836 to Munsey. In Munsey's system, either fast scan video signals from standard closed-circuit television cameras or received slow scan video signals are stored a frame at a time in a digital memory. The stored slow scan video signal then is read out of the memory and transmitted at a slow scan video signal transmission rate over a narrow frequency band, using well known frequency modulation techniques. One complete frame can be transmitted on the order of every 8 to 32 seconds depending on the desired quality of the received image. The received slow scan video signal is then stored in the memory of the receiver system, from which it is read out at a fast scan rate for generating a display on a standard closed circuit television monitor.

Due to the restrictions placed on the transmission of slow scan video signals by the narrow bandwidth of the transmission channel, only a few techniques have been employed for the transmission of a full color slow scan video signal that includes three complementary color component slow scan video signals. One such technique is the transmission of sequential frames of red, green and blue component signals and storing each frame in a separate slow-to-fast scan converter and reading out all three signals simultaneously at the fast scan rate for generating a display on a color closed-circuit television monitor. The major drawback of this technique is the amount of transmission time required to send and receive the three complementary color component slow scan video signals necessary for generating a display of one composite color image. The transmission time is three times as long as for monochrome slow scan video signal transmission or about 24 to 96 seconds depending on the desired received image resolution. An additional drawback of this technique is that the composite three color image is not available for viewing until reception of the last of the three complementary color component signals.

Another prior art technique is the interleaving of the red, green and blue component signals in a line interlace fashion, resulting in a system that still takes three times longer than its monochrome counterpart but which allows the viewer to inspect the image as a complete color entity as it is received.

Another scheme calls for the transmission of a line of the green component signal with the standard monochrome line synchronization pulse followed by a line of the red component signal and a line of the blue component signal without synchronization pulses, so that monochrome only equipment will sync and display the green frame thereby yielding limited monochrome compatibility in that the human eye is more sensitive to green brightness variations than to red or blue. Still another prior art technique is to transmit a frame of luminance information at the monochrome slow scan video signal transmission rate followed by the transmission of two color difference information frames at twice the monochrome rate, but at a lower level of resolution. The lines of video information are interlaced to give the appearance of a continuous color transmission. This technique still takes twice as long as the transmission of a monochrome slow scan video signal.

A technique that would result in the complete transmission of a color slow scan video signal in a time equivalent to that required for transmission of monochrome slow scan video signal has been suggested. According to this technique, an amplitude modulated chrominance information subcarrier in a frequency band below the band used for frequency modulating the luminance information signal is quadrature modulated with two color difference information signals. One problem with this technique is that the chrominance information subcarrier would necessarily be less immune to noise due to its amplitude modulated nature and would not hold up well in the noisy channels often encountered on telephone lines and through radio frequency transmissions. Additionally, amplitude modulated systems do not tolerate magnetic tape dropouts, which are often encountered when slow scan video signals are stored for transmission or playback on audio tape equipment. Furthermore, this system has limited monochrome compatibility due to luminance/chrominance channel separation problems.

Yet another prior art technique for the simultaneous transmission of luminance and chrominance information with monochrome compatibility is to amplitude modulate the already frequency modulated luminance subcarrier with the chrominance information much like that proposed for commercial AM radio stereo broadcasts. The defects in this technique as applied to slow scan television are similar to those of the previously discussed technique. In addition the opportunity for cross talk is significant. The fact that the amplitude modulated carrier frequency is shifting within the band in accordance with the frequency modulation together with the fact that the transmission channel is seldom linear in the band of interest results in an amplitude distortion generated by the frequency modulated component.

Both of these simultaneous transmission techniques also trade power for time thru the necessity of sharing channel power between two signals resulting in a faster but more noise susceptible transmission.

SUMMARY OF THE INVENTION

The present invention utilizes a technique of translating color slow scan video signals that enables such signals to be transmitted and received while using similar bandwidth requirements as that of prior art monochrome slow scan video systems and at less than twice the transmission time. The present invention also incorporates a desired feature of compatibility with existing monochrome slow scan television equipment.

The present invention utilizes the following techniques.

Three complementary color component slow scan video signals stored in a three-memory fast-to-slow scan converter, are read out in a picture element by picture element ("pixel") manner. Each set of three complementary color pixels is combined to provide a luminance information signal and two color difference signals that are representative of the chrominance information contained in the three complementary signals. The luminance information signal is subtracted from one of the three complementary signals to provide a first color difference signal representative of a first portion (R-Y) of the chrominance information; and the luminance information signal is subtracted from another of the three complementary signals to provide a second color difference signal representative of a second portion (B-Y) of the chrominance information. These color difference signals are encoded in accordance with the NTSC color transmission primary standards set forth by the National Television System Committee. The luminance information signal is frequency modulated according to the current monochrome slow scan television standard. This standard describes the slow scan television signal as an audio frequency modulated system with white generating a 2300 Hz tone and black generating a 1500 Hz tone, with tones in between 1500 Hz and 2300 Hz representing various shades of gray. Line and frame synchronization pulses take the form of bursts of a 1200 Hz tone, with a short, approximately 6 msec burst for line sync and a longer burst of approximately one slow scan video visible line interval in duration (approximately 66 msec) for frame sync. The first and second color difference signals are time-division-multiplexed at the slow scan video signal line rate to provide a chrominance information signal. The chrominance information signal is sequentially combined with the frequency modulated luminance information signal to provide a composite color slow scan video signal for transmission. The chrominance information signal is transmitted during an approximately 33 msec interval following the 66 msec visible line interval. The entire slow scan video signal line includes both the 66 msec interval and the 33 msec interval. This 33 msec time slot is occupied by alternating lines of "R-Y" and "-(B-Y)" information and includes a 3 msec chrominance sync pulse of either 2300 Hz to identify "R-Y" information or 1500 Hz to identify "B-Y" information.

"-(B-Y)" information is actually transmitted so that both color difference signals recover from their respective sync pulses with similar polarity, whereby 2300 Hz would represent maximum "R-Y" and minimum "B-Y" information with 1500 Hz representing minimum "R-Y" and maximum "B-Y" information.

Both the "R-Y" and "B-Y" baseband information are bandlimited to approximately one-half that of the luminance due to the faster speed of transmission for these components, 33 msec as opposed to 66 msec for the luminance. This has little effect on the received color image as it is well established in the art that the chrominance information signal can be substantially reduced in bandwidth due to the luminance/chrominance perception of the human eye.

The alternating nature of the "R-Y" and "B-Y" information signals causes a similar reduction in chrominance resolution in the vertical direction due to the fact that two complete luminance information signals are transmitted in the time that one pair of R-Y and B-Y information color difference signals has been transmitted. This also results in one of the two color difference information signals being missing during the transmission of each line of the luminance information signal. This problem preferably is overcome in the reception process by delaying the coincident luminance information and color difference signals and using the average of consecutively received color difference signals from the last previous and next lines of the received composite slow scan color video signal to replace the missing color difference signal.

Each line of the luminance information signal is stored as it is provided. Each stored line of the luminance information signal is retrieved over an interval corresponding to a slow scan video visible line interval to provide the luminance information signal that is sequentially combined with the chrominance information signal. Either a line of the first color difference signal or a line of the second color difference signal is alternately stored simultaneously with the storage of each line of the luminance information signal. The stored lines of the first and second color difference signals are alternately retrieved between successive intervals of retrieval of the stored lines of the luminance information signal to provide the first and second color difference signals that are time-division-multiplexed.

Upon reception of the composite video signal, the luminance information signal and the first and second color difference signals are first segregated from the received signal. Then the segregated first and second color difference signals are recombined with the segregated luminance information signal during the slow scan video visible line interval to provide three simultaneous complementary color component slow scan video signals.

The process of segregating the received signal includes the steps of (a) storing an odd-numbered line of the luminance information signal from every other line of the composite slow scan video signal beginning with the first line in each frame of the composite slow scan video signal and retrieving the stored odd-numbered line of the luminance information signal during the next even-numbered visible line interval of the composite slow scan video signal; (b) storing an even-numbered line of the luminance information signal from every other line of the composite slow scan video signal beginning with the second line in each form of the composite slow scan video signal and retrieving the stored even-numbered line of the luminance information signal during the next odd-numbered visible line interval of the composite slow scan video signal; and storing the color difference signal from every line of the composite slow scan video signal and retrieving the stored color difference signal during the next visible line interval of the composite slow scan video signal.

Monochrome compatibility is maintained by utilizing the present monochrome standards for transmission of the luminance information signal, which provides the monochrome component of the color image. A monochrome-only slow scan television receiver can receive the monochrome representation of a color image by merely responding to the normal line sync pulses, recording the monochrome compatible information in the customary manner and thereby ignoring the additional chrominance information. Likewise, a color slow scan television receiver can identify and receive a monochrome-only transmission. In such an embodiment, the receiver loads the luminance information signal and looks for the chrominance sync pulse but finds instead the standard line sync pulse. The receiver thereby recognizes the transmission as monochrome-only and loads the monochrome information signal into all three memories of the color scan converter to thereby display the monochrome image.

Additional features of the present invention are described in relation to the description of the preferred embodiment.

DESCRIPTION OF THE PREFERRED EMBODIMENT

Figure 1:
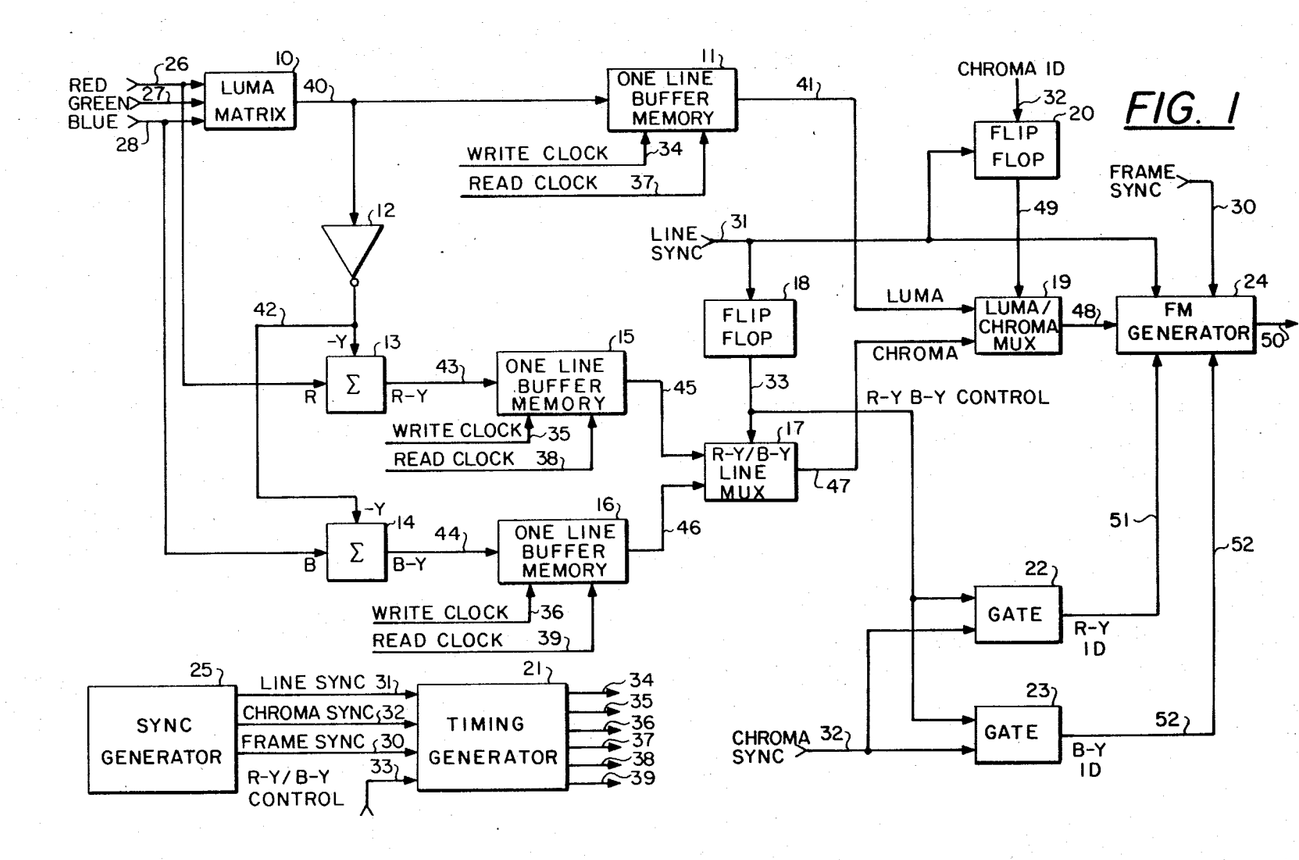
FIG. 1 is a block diagram of a color slow scan video signal transmitter for use in translating color slow scan video signals for transmission in accordance with the translation technique of the present invention.

Referring to FIG. 1, the preferred embodiment of a transmitter utilizing the color slow scan video signal translation technique of the present invention includes a luma matrix 10, a first one-line buffer memory 11, an inverter 12, a first summing circuit 13, a second summing circuit 14, a second one-line buffer memory 15, a third one-line buffer memory 16, a R-Y/B-Y line multiplexer (MUX) 17, a first flip-flop 18, a luma/chroma MUX 19, a second flip flop 20, a timing generator 21, a first gate 22, a second gate 23, an FM generator 24 and a sync signal generator 25.

Three complementary color component slow scan video signals are provided on lines 26, 27 and 28 to the luma matrix 10 from the three memories of a three-memory fast-to-slow scan converter (not shown).

Frame sync and line sync signals are provided respectively on lines 30 and 31; and a chroma sync signal is provided on line 32. The sync signals on line 30, 31 and 32 are provided by the sync signal generator 25.

The first flip-flop 18 provides an R-Y/B-Y control signal on line 33 in response to the line sync signal on line 31.

Figure 2:
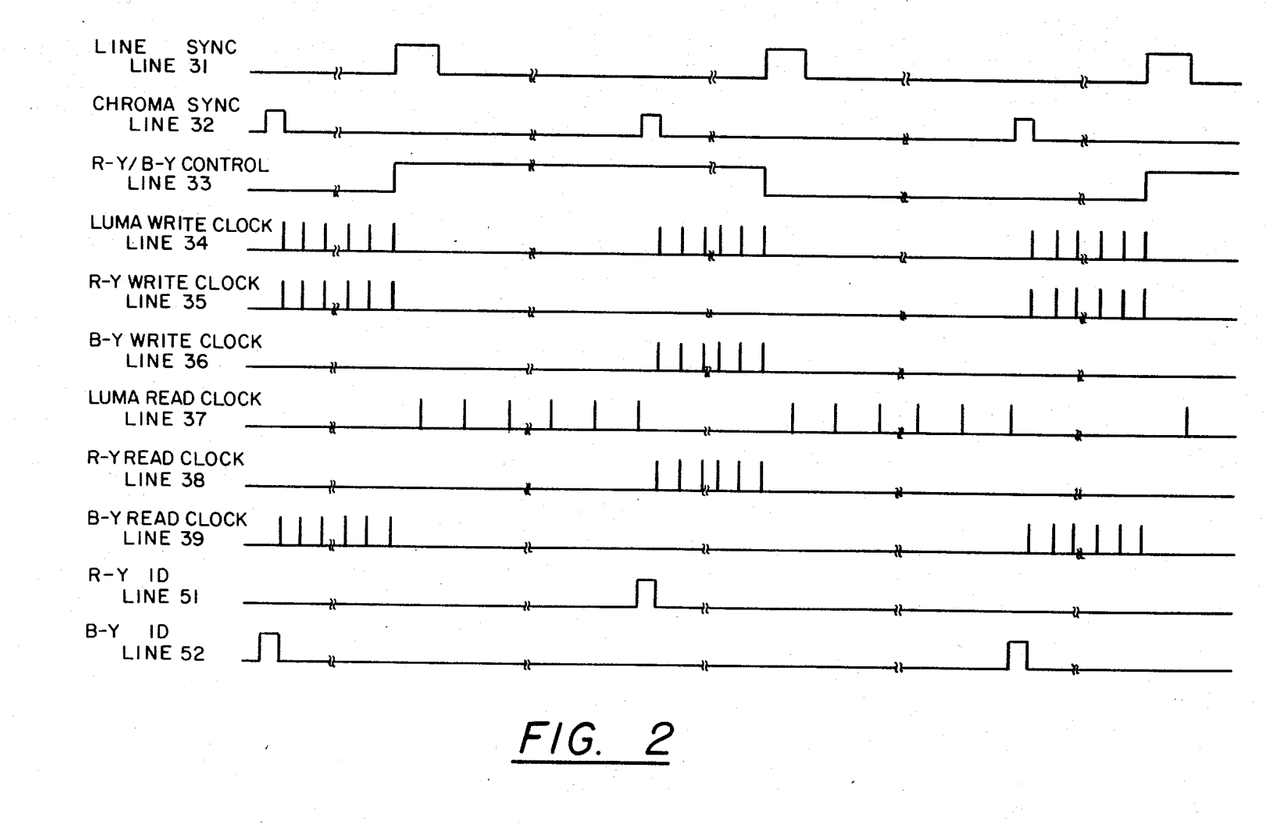
FIG. 2 is a timing diagram for the system of FIG. 1.

Referring to the timing diagram of FIG. 2, the line sync pulses on line 31 define the beginning of each slow scan video signal visible line interval of 66 msec duration and the chroma sync pulses on line 32 define the end of each visible line interval and the beginning of the 33 msec non-visible portion of each slow scan video signal line. The R-Y/B-Y control signal on line 33 is a binary signal that changes states at the slow scan video signal line rate in response to the leading edge of successive line sync pulses on line 31.

The timing generator 21 responds to the combination of the frame sync pulse on line 30, the line sync pulse on line 31, the chroma sync pulse on line 32 and the R-Y/B-Y control signal on line 33 by generating a pulsed luma write clock signal on line 34, a pulsed R-Y write clock signal on line 35, a pulsed B-Y write clock signal on line 36, a pulsed luma read clock signal on line 37, a pulsed R-Y read clock signal on line 38 and a pulsed B-Y read clock signal on line 39, as shown in the timing diagram of FIG. 2.

The luma write clock pulses are provided on line 34 to the first one-line buffer memory 11 following each chroma sync pulse during the non-visible portion of each slow scan video signal line.

The R-Y write clock pulses are provided on line 35 to the second one-line buffer memory 15 following alternate chroma sync pulses during the non-visible portion of alternate slow scan video signal lines.

The B-Y write clock pulses are provided on line 36 to the third one-line buffer memory 16 following alternate chroma sync pulses during the non-visible portion of the alternate slow scan video signal lines during which the R-Y write clock pulses are not provided on line 35.

The luma read clock pulses are provided at one-half the rate of the luma write clock pulses. The luma read clock pulses are provided on line 37 to the first one-line buffer memory following each line sync pulse during the visible line interval of each slow scan video signal line.

The R-Y read clock pulses are provided on line 38 to the second one-line buffer memory following alternate chroma sync pulses during the non-visible portion of the alternate slow scan video signal lines during which the R-Y write clock pulses are not provided on line 35.

The B-Y read clock pulses are provided on line 39 to the third one-line buffer memory following alternate chroma sync pulses during the non-visible portion of the alternate slow scan video signal lines during which the B-Y write clock pulses are not provided on line 36.

The luma matrix 10 provides a luminance information signal on line 40 by combining the three complementary color component slow scan video signals on lines 26, 27 and 28. The luminance information signal on line 40 is stored in the first one-line buffer memory 11 during the nonvisible visible portion of each slow scan video signal line in response to the luma write clock pulses on line 34. The luminance information signal is retrieved on line 41 from the first one-line buffer memory 11 in response to the luma read clock pulses on line 37 during the visible line portion of each next following slow scan video signal line.

The chrominance information signal is formed by combining and further processing the luminance information signal on line 40 with two of the three complementary color component slow scan video signals on lines 26–28. The luminance information signal on line 40 is inverted by the inverter 12 to provide an inverted luminance information signal on line 42. The first summing circuit 13 sums the red component signal from line 26 with the inverted luminance information signal from line 42 to provide a first color difference signal on line 43 that is representative of the R-Y portion of the chrominance information. The second summing circuit 14 sums the blue component signal from line 28 with the inverted luminance information signal from line 42 to provide a second color difference signal on line 44 that is representative of the B-Y portion of the chrominance information.

The R-Y color difference signal on line 43 is stored in the second one-line buffer memory 15 during the non-visible portion of alternate slow scan video signal lines in response to the R-Y write clock pulses on line 35. The R-Y color difference signal is retrieved on line 45 from the second one-line buffer memory 15 in response to the R-Y read clock pulses on line 38 during the non-visible portion of the alternate slow scan video signal lines during which the R-Y color difference signal is not being stored.

The B-Y color difference signal on line 44 is stored in the third one-line buffer memory 16 in response to the B-Y write clock pulses on line 36 during the non-visible portion of the alternate slow scan video signal lines during which the R-Y color difference signal is not being stored. The B-Y color difference signal is retrieved on line 46 from the third one-line buffer memory 16 in response to the B-Y read clock pulses on line 39 during the non-visible portion of the alternate slow scan video signal lines during which the B-Y color difference signal is not being stored.

The R-Y/B-Y line MUX 17 multiplexes the respective R-Y and B-Y color difference signals on lines 45 and 46 at the slow scan video signal line rate in response to the R-Y/B-Y control signal on line 33 from the flip-flop 18 to provide a chrominance information signal on line 47.

Figures 3, 6:
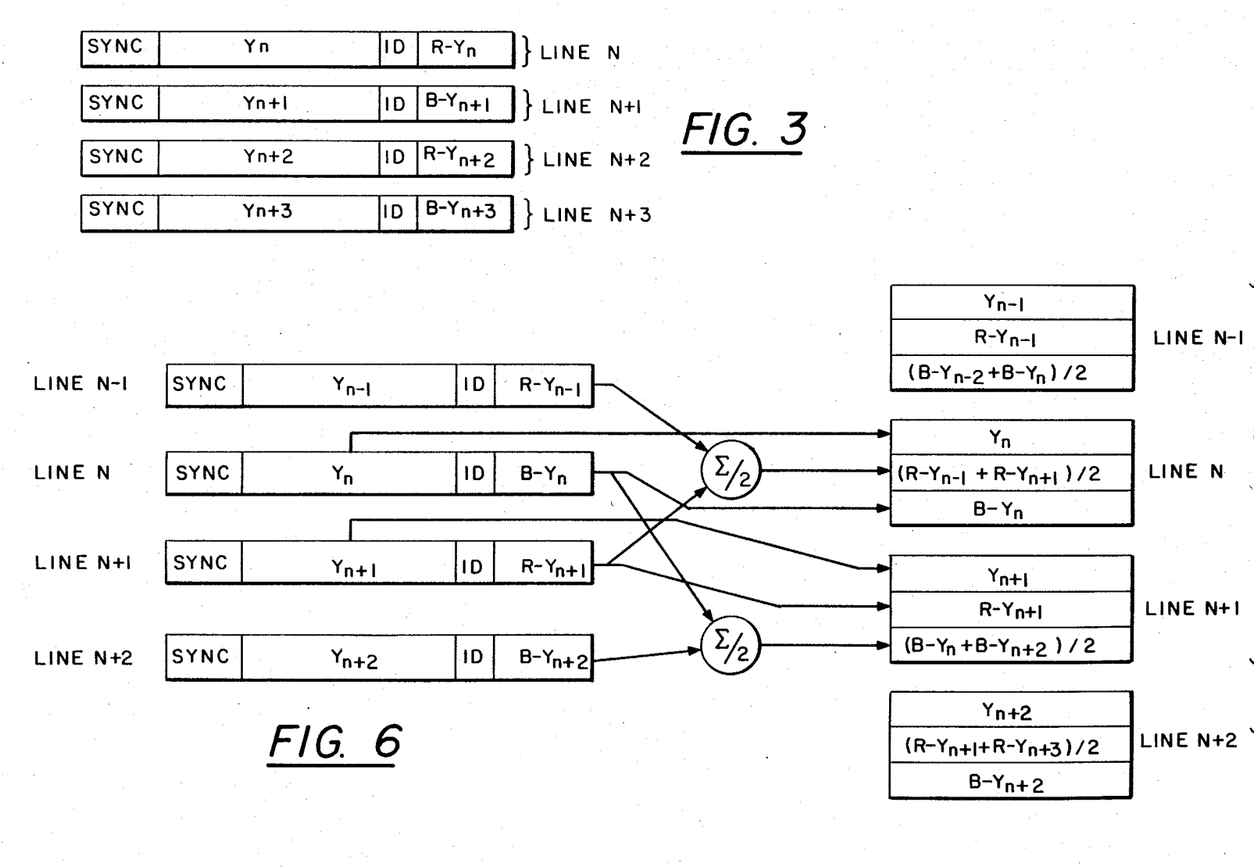
FIG. 3 illustrates the relationship between the components of the composite color slow scan video signal translated by the system of FIG. 1.
FIG. 6 illustrates the relationship between the components of the composite and recombined signals in the system of FIG. 4.

The luma/chroma MUX 19 sequentially combines the retrieved luminance information signal from line 41 and the chrominance information signal from line 47 during each slow scan video signal line to provide a composite color slow scan video signal on line 48. The sequential relationship between the retrieved luminance information and color difference signal components in the composite color slow scan video signal on line 47 is illustrated in FIG. 3 for successive color slow scan video signal lines.

The luma/chroma MUX 19 is controlled by a luma/chroma control signal provided on line 49 by the flip-flop 20 in response to the line sync signal on line 31 and the chroma sync signal on line 32. The luma/chroma control signal on line 49 changes state in response to each line sync pulse on line 31 to cause the luma/chroma MUX 19 to provide the retrieved luminance information signal from line 41 onto line 48 during the visible line portion of each slow scan video signal line and changes state in response to each chroma sync pulse on line 32 to cause the luma/chroma MUX 19 to provide the chrominance information signal from line 47 onto line 48 during the non-visible portion of each slow scan video signal line.

The FM generator 24 frequency modulates the composite color slow scan video signal on line 48, the frame sync signal on line 30 and the line sync signal on line 31 as described hereinabove to provide a frequency modulated composite color slow scan video signal on line 50 for transmission.

In order to separately identify the respective R-Y and B-Y color difference signal components in the modulated composite signal on line 50, the FM generator 24 frequency modulates the composite signal on line 48 to include a chrominance ID component at either a first or second frequency during the chroma sync interval in accordance with indications by chrominance ID signals provided on lines 51 and 52 from the gates 22 and 23 respectively. The gate 22 provides an R-Y ID pulse on line 51 during the interval of the chroma sync pulse on line 32 when the R-Y/B-Y control signal on line 33 causes the R-Y/B-Y line MUX 17 to pass the R-Y color difference signal from line 45 onto line 47. The gate 23 provides a B-Y ID pulse on line 52 during the interval of the chroma sync pulse on line 32 when the R-Y/B-Y control signal on line 33 causes the R-Y/B-Y line MUX 17 to pass the B-Y color difference signal from line 46 onto line 47.

The FM generator 24 responds to the chrominance ID signals on lines 51 and 52 by modulating the chroma ID component in the composite signal on line 50 at 2300 Hz to identify an R-Y color difference signal and at 1500 Hz to identify a B-Y color difference signal. The modulated chroma ID component in the composite signal on line 50 is of the same duration at the chroma sync pulse on line 32.

Figure 4:
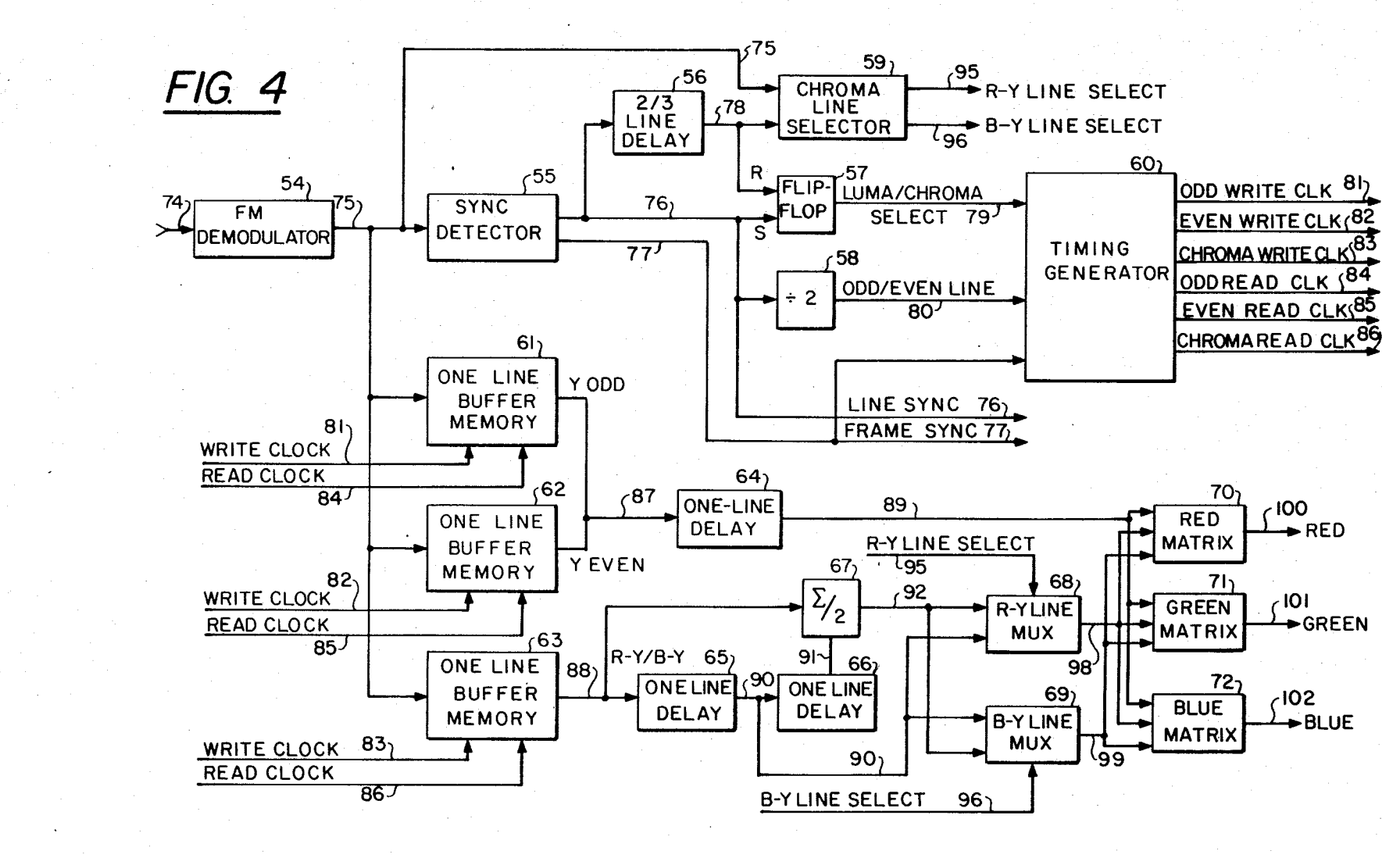
FIG. 4 is a block diagram of a color slow scan video signal receiver for use in translating color slow scan video signals received from the transmitter of FIG. 1.

A preferred embodiment of a slow scan video signal receiver for use in translating the composite color slow scan video signal transmitted by the transmitter of FIG. 1 is described with reference to FIG. 4. The receiver includes an FM demodulator 54, a sync detector 55, a two-thirds-line delay circuit 56, a flip-flop 57, a "divide-by-two" counter 58, a chroma line selector 59, a timing generator 60, a first one-line buffer memory 61, a second one-line buffer memory 62, a third one-line buffer memory 63, a first one-line delay circuit 64, a second one-line delay circuit 65, a third one-line delay circuit 66, an averaging circuit 67, an R-Y line MUX 68, a B-Y line MUX 69, a red matrix 70, a green matrix 71 and a blue matrix 72.

The frequency modulated composite color slow scan video signal is received on line 74 and demodulated by the FM demodulator 54 to provide a demodulated composite color slow scan video signal on line 75.

The sync detector 55 detects the line sync pulses and the frame sync pulses in the composite signal on line 75 and provides the detected line sync signal on line 76 and the detected frame sync signal on line 77.

The two-thirds-line delay circuit 56 delays the line sync signal on line 76 to provide a delayed line sync signal on line 78 in which the pulses are delayed 66 msec from the pulses in the line sync signal on line 76.

The flip-flop 57 provides a luma/chroma select signal on line 79 in response to the line sync signal on line 76 and the delayed sync signal on line 78. The luma/chroma select signal on line 79 changes to a luma select state in response to the leading edge of each pulse in the line sync signal on line 76, and then changes to a chroma select state 66 msec later in response to the leading edge of each delayed line sync signal on line 78. The luma/chroma select signal on line 79 remains in the chroma select state for 33 msec until the next line sync pulse is provided on line 76. The luma select state defines the visible line portion of each slow scan video signal line and the chroma select state defines the non-visible portion of each slow scan video signal line.

The divide-by-two counter provides an odd/even signal on line 80 in response to a count of the line sync pulses on line 76. The odd/even signal on line 80 changes state at the beginning of each line sync pulse on line 76. The odd/even signal on line 80 changes state at the beginning of each line sync pulse on line 76.

Figure 5:
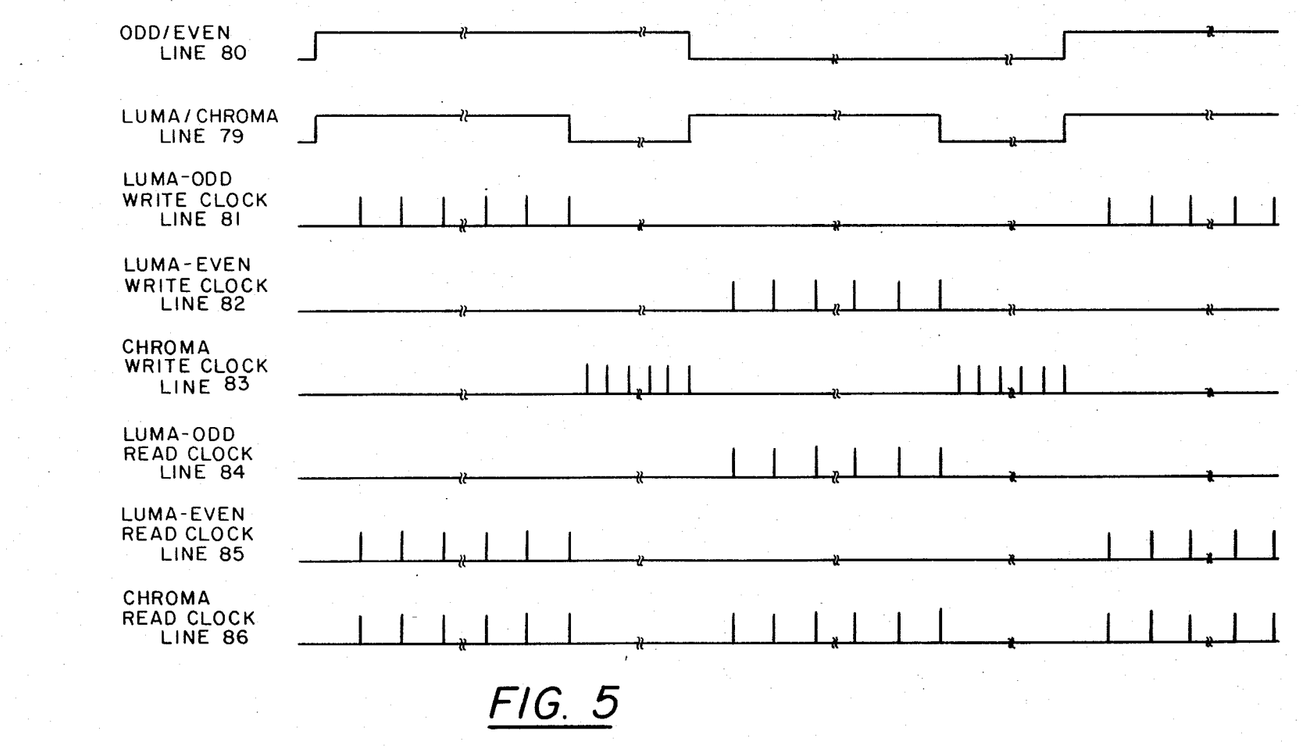
FIG. 5 is a timing diagram for the system of FIG. 4.

Timing diagrams of the odd/even signal on line 80 and the luma/chroma select signal on line 79 are illustrates in FIG. 5.

The chroma line selector 59 detects the chrominance ID signal components in the demodulated composite signal on line 75 and alternately provides at the slow scan video signal line rate an R-Y line select signal on line 95 and a B-Y line signal on line 96. The R-Y and B-Y select signals on lines 95 and 96 are complementary to each other and changes states in response to the leading edge of the delayed line sync signal on line 78, which occurs at the end of the visible line interval of each slow scan video signal line.

The odd/even signal on line 80, the luma/chroma select signal on line 79 and the frame sync signal on line 77 are provided to the timing generator 60, which responds thereto by providing the clock signals illustrated in FIG. 5.

The timing generator 60 generates a pulsed luma-odd write clock signal on line 81, a pulsed luma-even write clock signal on line 82, a pulsed chroma write clock signal on line 83, a pulsed luma-odd read clock signal on line 85, and a pulsed chroma read clock signal on line 86.

The luma-odd write clock pulses are provided on line 81 to the first one-line buffer memory 61 during the visible line interval of each odd-numbered slow scan video signal line.

The luma-even write clock pulses are provided on line 82 to the second one-line buffer memory 62 during the visible line interval of each even-numbered slow can video signal line.

The chroma write clock pulses are provided on line 83 to the third one-line buffer memory 63 during the nonvisible portion of each slow scan video signal line. The chroma write clock pulses on line 83 are generated at twice the rate of the luma write clock pulses on lines 81 and 82.

The luma-odd read clock pulses are provided on line 84 to the first one-line buffer memory during the visible line interval of each even-numbered slow scan video signal line.

The luma-even read clock pulses are provided on line 85 to the second one-line buffer memory during the visible line interval of each odd-numbered slow scan video signal line.

The chroma read clock pulses are provided on line 86 to the third one-line buffer memory during the visible line interval of each slow scan video signal line.

The read clock pulses on lines 84, 85 and 86 are provided at the same rate as the luma write clock pulses on lines 81 and 82.

The luminance information signal component and the first and second color difference signal components are segregated from the composite color slow scan video signal on line 75 by selective storage of such components in the first, second and third one-line buffer memories 61, 62, 63.

The luminance information signal component from odd-numbered slow scan video signal lines of the composite signal on line 75 is stored in the first one-line buffer memory 61 in response to the luma-odd write clock pulses on line 81 during the visible line interval of each odd-numbered slow scan video signal line. The luminance information signal stored in the first one-line buffer memory 61 is retrieved therefrom onto line 87 in response to the luma-odd read clock pulses on line 84 during the visible line interval of the next even-numbered slow scan video signal line.

The luminance information signal component from even-numbered slow scan video signal lines of the composite signal on line 75 is stored in the second one-line buffer memory 62 in response to the luma-even write clock pulses on line 82 during the visible line interval of each even-numbered slow scan video signal line. The luminance information signal stored in the second one-line buffer memory 62 is retrieved therefrom onto line 87 in response to the luma-even read clock pulses on line 85 during the visible line interval of the next odd-numbered slow scan video signal line.

The chrominance information signal component from each slow scan video signal line of the composite signal on line 75 is stored in the one-line buffer memory 63 in response to the chroma write clock pulses on line 83 during the nonvisible line portion of each slow scan video signal line. The chrominance information signal stored in the third oneline buffer memory 63 is retrieved therefrom onto line 88 in response to the chroma read clock pulses on line 86 during the visible line interval of the next slow scan video signal line.

The luminance information signal provided on line 87 is delayed by the first one-line delay circuit 64 for the duration of one slow scan video signal line to provide a one-line-delayed color difference signal on line 89 to the red matrix 70, the green matrix 71 and the blue matrix 72.

During any one visible line interval of the slow scan video signal either an R-Y color difference signal or a B-Y color difference signal is retrieved from the third oneline buffer memory onto line 88. The color difference signal on line 88 is delayed by the second one-line delay circuit 65 for the duration of the one slow scan video signal line to provide a one-line-delayed color difference signal on line 90. The one-line-delayed color difference signal on line 90 is further delayed by the third one-line delay circuit 66 for the duration of an additional slow scan video signal line to provide a two-line-delayed color difference signal on line 91.

The retrieved color difference signal on line 88 and the two-line-delayed color difference signal on line 91 are of the same character, i.e. R-Y or B-Y. The retrieved color difference signal on line 88 and the two-line-delayed color difference signal on line 91 are averaged by the averaging circuit 67 to provide an averaged color difference signal of one character on line 92 during the same visible line interval that the one-line-delayed color difference signal of the other character is provided on line 90.

Both the averaged color difference signal on line 92 and the one-line-delayed color difference signal on line 90 are provided to each of the R-Y MUX 68 and the B-Y line MUX 69.

The R-Y line MUX 68 multiplexes the signals on lines 90 and 92 in accordance with the state of the R-Y line select signal on line 95 as determined by the indication provided by the chrominance ID signal detected on line 75 by the chroma line selector 59. The R-Y line MUX 68 provides the averaged R-Y color difference signal on line 98 when the chrominance ID signal on line 75 indicates that the R-Y color difference signal is being retrieved from the third one-line buffer memory 63 and provides the one-line-delayed R-Y color difference signal on line 98 when the chrominance ID signal on line 75 indicates that the B-Y color difference signal is being retrieved from the third one-line buffer memory 63.

The B-Y line MUX 69 multiplexes the signals on lines 90 and 92 in accordance with the state of the B-Y line select signal on line 96 as determined by the indication provided by the chrominance ID signal detected on line 75 by the chroma line selector 59. The B-Y line MUX 69 provides the averaged B-Y color difference signal on line 99 when the chrominance ID signal on line 75 indicates that the B-Y color difference signal is being retrieved from the third one-line buffer memory 63 and provides the one-line-delayed B-Y color difference signal on line 99 when the chrominance ID signal on line 75 indicates that the R-Y color difference signal is being retrieved from the third one-line buffer memory 63.

The multiplexed R-Y and B-Y color difference signals on lines 98 and 99 are recombined with the luminance information signal on line 89 in each of the red matrix 70, the green matrix 71 and the blue matrix 72 to provide simultaneous complementary red, green and blue component slow scan video signals on lines 100, 101 and 102 respectively.

FIG. 6 illustrates the sequential relationship between the luminance information signal components and the R-Y and B-Y color difference signal components in the composite signal on line 75 and in the signals on lines 89, 98 and 99 that are recombined by the red, green and blue matrices 70, 71 and 72 respectively.

The complementary red, green and blue component signals on lines 100, 101 and 102 respectively are provided to a three memory slow-to-fast color scan converter (not shown).

The above-described embodiment is a digital implementation of the present invention. Alternatively, the present invention can be implemented in an equivalent analog embodiment or in a digital microcomputer that is programmed to perform the functions of the digital embodiment described herein.

I claim:

1. A system for translating three complementary color component slow scan video signals into a single composite color slow scan video signal incorporating the luminance and chrominance information contained in the three complementary signals, comprising
    means for combining the three complementary signals to provide a luminance information signal;
    means for subtracting the luminance information signal from one of the three complementary signals to provide a first color difference signal representative of a first portion of the chrominance information;
    means for subtracting the luminance information signal from another of the three complementary signals to provide a second color difference signal representative of a second portion of the chrominance information;
    means for time-division-multiplexing the first and second color difference signals at the slow scan video signal line rate to provide a chrominance information signal;
    means for sequentially combining the luminance information signal and the chrominance information signal during each slow scan video signal line to provide a composite color slow scan video signal;
    means for storing a line of the luminance information signal during a non-visible portion of the slow scan video line interval of the composite signal and for retrieving the stored line of the luminance information signal over an interval corresponding to a composite slow scan video signal visible line interval to provide the luminance information signal that is sequentially combined with the chrominance information signal; and
    means for alternately storing either a line of the first color difference signal or aline of the second color difference signal simultaneously with the storage of each line of the luminance information signal and for alternately retrieving the stored lines of the first and second color difference signals during the interval between successive intervals of retrieval of the stored lines of the luminance information signal to provide the first and secod color difference signals that are time-division-multiplexed.

2. A system according to claim 1,
    wherein the means for storing the luminance information signal store each line of the luminance information signal during a non-visible line interval of the composite signal subsequent to the retrieval of the previous line of the lumininance information signal and at a storage rate that is faster than the rate of retrieval of each line of the luminance information signal.

3. A system according to claim 1, further comprising means for providing line sync pulses at the slow scan video line rate; and
    means for providing chrominance sync pulses at the slow scan video line rate and delayed from the line sync pulses by the duration of the slow scan video visible line interval;
    wherein the means for combining the luminance information signal and the chrominance information signal are responsive to the sync pulses for providing the luminance information signal in the slow scan video visible line interval following the line sync pulse and for providing the chrominance information signal in the interval following the chrominance sync pulse prior to the next line sync pulse.

4. A system according to claim 3, further comprising means for providing a chrominance ID signal to indicate whether the first or second color difference signal is being retrieved; and
    means for frequency modulating the composite slow scan video signal to include a chrominance ID component at either a first or second frequency during the chrominance sync pulse in accordance with the indication of the chrominance ID signal.

5. A system for translating into three complementary color component slow scan video signals, a composite color slow scan video signal containing a luminance information signal within a visible line interval of each slow scan video signal line and a chrominance information signal within a separate second interval of each slow scan video signal line, wherein the chrominance information signal includes during the non-visible portions of alternate slow scan video signal lines, a first color difference signal derived by subtracting the luminance information signal from one of three complementary color slow scan video signals and a second color difference signal derived by subtracting the luminance information signal from another of three complementary color slow scan video signals, said system comprising
    means for segregating from the composite video signal the luminance information signal and the first and second color difference signals; and
    means for recombining the segregated first and second color difference signals with the segregated luminance information signal during the slow scan video visible line interval to provide three simultaneous complementary color component slow scan video signals;
    wherein the segregating means include
    means for storing an odd-numbered line of the luminance information signal from every other line of the composite slow scan video signal beginning with the first line in each frame of the composite slow scan video signal and for retrieving the stored odd-numbered line of the luminance information signal during the next even-numbered visible line interval of the composite slow scan video signal;

means for storing an even-numbered line of the luminance information signal from every other line of the composite slow scan video signal beginning with the second line in each frame of the composite slow scan video signal and for retrieving the stored even-numbered line of the luminance information signal during the next odd-numbered visible line interval of the composite slow scan video signal;

means for storing the color difference signal from every line of the composite slow scan video signal and for retrieving the stored color difference signal during the next visible line interval of the composite slow scan video signal;

means for delaying the retrieved color difference signal by the duration of one slow scan video signal line to provide a one-line-delayed color difference signal;

means for further delaying the one-line-delayed color difference signal by the duration of an additional slow scan video signal line to provide a two-line-delayed color difference signal; and means for averaging the retrieved color difference signal with the two-line-delayed color difference signal to provide an averaged first or second color difference signal during the same interval that a one-line-delayed second or first color difference signal is provided respectively.

6. A system according to claim 5, wherein the non-visible portion of each composite slow scan video signal line is less than the visible line interval of each slow scan video signal line; and wherein the means for storing and retrieving the color difference signal retrieve the color difference signal at a slower rate than the rate at which the color difference signal is stored in order to extend the retrieved color difference signal over the next visible line interval so as to be coincident with the luminance information signal retrieved during the next visible line interval.

7. A system according to claim 5, wherein the composite slow scan video signal includes a chrominance ID component at either a first or second frequency to indicate whether the first or second color difference signal is being retrieved, the system further comprising means for demodulating the composite slow scan video signal to provide a chrominance ID signal indicating whether the first or second color difference signal is being retrieved;

means for multiplexing the averaged color difference signal and the one-line-delayed color difference signal in accordance with the chrominance ID signal to provide the averaged color difference signal to the recombining means when the first color difference signal is being retrieved and to provide the one-line-delayed color difference signal to the recombining means when the second color difference signal is being retrieved; and means for multiplexing the averaged color difference signal and the one-line-delayed color difference signal in accordance with the chrominance ID signal to provide the averaged color difference signal to the recombining means when the second color difference signal is being retrieved and to provide the one-line-delayed color difference signal to the recombining means when the first color difference signal is being retrieved.

8. A system according to claim 7, further comprising means for delaying the retrieved luminance information signals by the duration of one slow scan video signal line and to provide the delayed luminance information signals to the recombining means.

9. A system according to claim 5, further comprising means for delaying the retrieved luminance information signals by the duration of one slow scan video signal line and to provide the delayed luminance information signals to the recombining means.

10. A method of translating three complementary color component slow scan video signals into a single composite color slow scan video signal incorporating the luminance and chrominance information contained in the three complementary signals, comprising the steps of (a) combining the three complementary signals to provide a luminance information signal;

(b) subtracting the luminance information signal from one of the three complementary signals to provide a first color difference signal representative of a first portion of the chrominance information;

(c) subtracting the luminance information signal from another of the three complementary signals to provide a second color difference signal representative of a second portion of the chrominance information;

(d) time-division-multiplexing the first and second color difference signals at the slow scan video signal line rate to provide a chrominance information signal;

(e) sequentially combining the luminance information signal and the chrominance information signal during each slow scan video signal line to provide a composite color slow scan video signal;

(f) storing a line of the luminance information signal during a non-visible line portion of the slow scan video line interval of the composite signal and retrieving the stored line of the luminance information signal over an interval corresponding to a composite slow scan video signal visible line interval to provide the luminance information signal that is sequentially combined with the chrominance information signal in step (e); and (g) alternately storing either a line of the first color difference signal or a line of the second color difference signal simultaneously with the storage of each line of the luminance information signal and alternately retrieving the stored lines of the first and second color difference signals during the interval between successive intervals of retrieval of the stored lines of the luminance information signal to provide the first and second color difference signals that are time-division-multiplexed in step (d).

11. A method according to claim 10, wherein step (f) comprises storing each line of the luminance information signal during a non-visible line interval of the composite signal subsequent to the retrieval of the previous line of the lumininance information signal and at a storage rate that is faster than the rate of retrieval of each line of the luminance information signal.

12. A method according to claim 10, further comprising the steps of (h) providing line sync pulses at the slow scan video line rate; and (i) providing chrominance sync pulses at the slow scan video line rate and delayed from the line sync pulses by the duration of the slow scan video visible line interval;

wherein in step (e) the luminance information signal and the chrominance information signal are responsive to the sync pulses for providing the luminance information signal in the slow scan video visible line interval following the line sync pulse and for providing the chrominance information signal in the interval following the chrominance sync pulse prior to the next line sync pulse.

13. A method according to claim 12, further comprising the steps of (j) providing a chrominance ID signal to indicate whether the first or second color difference signal is being retrieved; and (k) frequency modulating the composite slow scan video signal to include a chrominance ID component at either a first or second frequency during the chrominance sync pulse in accordance with the indication of the chrominance ID signal.

14. A method of translating into three complementary color component slow scan video signals, a composite color slow scan video signal containing a luminance information signal within a visible line interval of each slow scan video signal line and a chrominance information signal within a separate second interval of each slow scan video signal line, wherein the chrominance information signal includes during the non-visible portions of alternate slow scan video signal lines, a first color difference signal derived by subtracting the luminance information signal from one of three complementary color slow scan video signals and a second color difference signal derived by subtracting the luminance information signal from another of three complementary color slow scan video signals, said method comprising the steps of (a) segregating from the composite video signal the luminance information signal and the first and second color difference signals; and (b) recombining the segregated first and second color difference signals with the segregated luminance information signal during the slow scan video visible line interval to provide three simultaneous complementary color component slow scan video signals;

wherein step (a) includes the steps of (c) storing an odd-numbered line of the luminance information signal from every other line of the composite slow scan video signal beginning with the first line in each frame of the composite slow scan video signal and retrieving the stored odd-numbered line of the luminance information signal during the next even-numbered visible line interval of the composite slow scan video signal;

(d) storing an even-numbered line of the luminance information signal from every other line of the composite slow scan video signal beginning with the second line in each frame of the composite slow scan video signal and retrieving the stored even-numbered line of the luminance information signal during the next odd-numbered visible line interval of the composite slow scan video signal;

(e) storing the color difference signal from every line of the composite slow scan video signal and retrieving the stored color difference signal during the next visible line interval of the composite slow scan video signal;

(f) delaying the retrieved color difference signal by the duration of one slow scan video signal line to provide a one-line-delayed color difference signal;

(g) further delaying the one-line-delayed color difference signal by the duration of an additional slow scan video signal line to provide a two-line-delayed color difference signal; and (h) averaging the retrieved color difference signal with the two-line-delayed color difference signal to provide an averaged first or second color difference signal during the same interval that a one-line-delayed second or first color difference signal is provided respectively.

15. A method according to claim 14, wherein the non-visible portion of each composite slow scan video signal line is less than the visible line interval of each slow scan video signal line; and wherein step (e) comprises retrieving the color difference signal at a slower rate than the rate at which the color difference signal is stored in order to extend the retrieved color difference signal over the next visible line interval so as to be coincident with the luminance information signal retrieved during the next visible line interval.

16. A method according to claim 14, wherein the composite slow scan video signal includes a chrominance ID component at either a first or second frequency to indicate whether the first or second color difference signal is being retrieved, the system further comprising the steps of (i) demodulating the composite slow scan video signal to provide a chrominance ID signal indicating whether the first or second color difference signal is being retrieved;

(j) multiplexing the averaged color difference signal and the one-line-delayed color difference signal in accordance with the chrominance ID signal to provide the averaged color difference signal for recombination pursuant to step (b) when the first color difference signal is being retrieved and to provide the one-line-delayed color difference signal for recombination pursuant to step (b) when the second color difference signal is being retrieved; and (k) multiplexing the averaged color difference signal and the one-line-delayed color difference signal in accordance with the chrominance ID signal to provide the averaged color difference signal for recombination pursuant to step (b) when the second color difference signal is being retrieved and to provide the one-line-delayed color difference signal for recombination pursuant to step (b) when the first color difference signal is being retrieved.

17. A method according to claim 16, further comprising the steps of (l) delaying the retrieved luminance information signals by the duration of one slow scan video signal line and providing the delayed luminance information signals for recombination pursuant to step (b).

18. A method according to claim 14, further comprising the steps of (l) delaying the retrieved luminance information signals by the duration of one slow scan video signal line and providing the delayed luminance information signals for recombination pursuant to step (b).

* * * * *